Patented Jan. 2, 1951

2,536,634

UNITED STATES PATENT OFFICE 2,536,634

PROCESS FOR THE PREPARATION OF CELLULOSIC ESTERS

Jean Fraizy, Le Peage de Roussillon, and Louis Rony, Roanne, France, assignors, by mesne assignments, to Societe Rhodiaceta, a corporation of the Republic of France No Drawing. Application September 23, 1947, Serial No. 775,750. In France December 6, 1945

8 Claims. (Cl. 260—227)

The processes generally used for the preparation of cellulose esters in homogeneous phase consist essentially in causing a fatty acid anhydride to act on cellulose (linters, wood pulp, etc.) in the presence of a catalyst and of a solvent for the formed cellulose ester which can be the corresponding fatty acid.

It has already been proposed to neutralize a part of the catalyst during esterification by the addition of an alkaline salt of a weak acid, for example, of an alkaline salt of a fatty acid.

The present invention is concerned with a process for the esterification of cellulose, permitting the obtaining of products having improved properties, this process being characterized by the fact that all or part of the catalyst is neutralized in one or more steps, in the course of the esterification reaction proper, by means of a basic organic substance.

In carrying out this process any basic organic substance may be used, for example, aniline or its derivatives, pyridine or its derivatives, products acting as very weak bases such as amides, in particular acetamide, mixtures containing these substances, etc.

These agents may be added in one or more steps and at any desired stage of the esterification reaction proper.

In the following examples, which illustrate the method of carrying out the invention, the parts indicate parts by weight. The invention is not limited to these examples and, in particular, one can vary the molecular proportions of the organic substance and of the catalyst.

Example I 100 parts of linters having undergone essentially a known pretreatment with glacial acetic acid, acetic anhydride and sulfuric acid, are acetylated by the addition of 200 parts of acetic anhydride and such an amount of sulfuric acid, that taking into consideration the sulfuric acid which may be used in the course of the pretreatment, the reaction should take place in the presence of 8% sulfuric acid based on the initial weight of the linters.

Thirty minutes after the addition of this acetylating mixture, 65 parts of glacial acetic acid containing 2.4 parts of acetamide are added, or one molecule for two of the total sulfuric acid. The reaction is permitted to continue until the reaction mass contains no more flocks or non-acetylated fibers which requires fifteen to twenty minutes more than if one had not introduced the acetamide.

After stopping the acetylation by the addition of aqueous acetic acid, ripening until the obtaining of solubility in acetone and precipitating by known means, a cellulose acetate of valuable properties is obtained.

Particularly the filterability of an acetone solution prepared with said acetate (i. e. the volume of solution filtered on a filter of a predetermined character and surface under constant pressure in a predetermined period of time) is 50% to 70% higher than that of acetone solutions of acetates obtained by a similar procedure but in the absence of acetamide, and more than 30% higher than that of acetone solutions of acetates obtained by a similar procedure but with the replacement of acetamide by an alkaline salt of a weak acid according to processes already known.

Example II

In the process described in Example I, the 2.4 parts of acetamide are replaced by an equimolecular quantity, i. e. 3.21 parts of pyridine, while other conditions remain unchanged. The cellulose acetate thus prepared shows improved properties of the same order of magnitude as in Example I.

Example III 100 parts of wood pulp which may be subjected to a known pretreatment with glacial acetic acid, acetic anhydride and sulfuric acid are acetylated by 200 parts of acetic anhydride in the presence of sulfuric acid as an esterification catalyst and such a quantity of methylene chloride that the methylene chloride content of the acetylating bath may be 50%. After forty-five minutes of acetylation, 50 parts of acetic acid containing such an amount of aniline that half of the total sulfuric acid is neutralized, are added to the reaction mixture. The acetylation is terminated as in Example I.

The cellulose acetate thus obtained shows a similar improvement of quality as the acetates obtained in Examples I and II.

We claim:

1. A process for acetylating cellulose by means of a bath containing an acetylating agent, an acid catalyst and a solvent for the acetate to be formed, said process comprising the step of neutralizing the catalyst by addition to the reaction mixture, during the acetylation reaction proper, of an organic substance with a basic function, selected from the group consisting of aniline, pyridine and acetamide.

2. A process as claimed in claim 1, in which a part only of the catalyst is neutralized.

3. A process as claimed in claim 1, in which the total amount of the catalyst is neutralized.

4. A process as claimed in claim 1, in which neutralization of the catalyst is carried out in one step.

5. A process as claimed in claim 1, in which neutralization of the catalyst is carried out in several steps.

6. A process as claimed in claim 1, in which the catalyst is neutralized by means of acetamide.

7. A process as claimed in claim 1, in which the catalyst is neutralized by means of pyridine.

8. A process as claimed in claim 1, in which the catalyst is neutralized by means of aniline.

JEAN FRAIZY.
LOUIS RONY.

REFERENCES CITED

The following references are of record in the file of this patent:

UNITED STATES PATENTS

| Number | Name | Date |
|---|---|---|
| 1,967,405 | Haskins et al. | July 24, 1934 |
| 2,005,223 | Dreyfus | June 18, 1935 |
| 2,259,462 | Fletcher | Oct. 21, 1941 |

FOREIGN PATENTS

| Number | Country | Date |
|---|---|---|
| 921,856 | France | Dec. 6, 1945 |

OTHER REFERENCES

Hess et al., Berelite 61 B, pp. 1460–1462, 1927.